(12) United States Patent
Schiller

(10) Patent No.: US 11,386,884 B2
(45) Date of Patent: Jul. 12, 2022

(54) PLATFORM AND SYSTEM FOR THE AUTOMATED TRANSCRIPTION OF ELECTRONIC ONLINE CONTENT FROM A MOSTLY VISUAL TO MOSTLY AURAL FORMAT AND ASSOCIATED METHOD OF USE

(71) Applicant: VHS, LLC, Culpeper, VA (US)

(72) Inventor: Victor Schiller, Culpeper, VA (US)

(*) Notice: Subject to any disclaimer, the term of this patent is extended or adjusted under 35 U.S.C. 154(b) by 154 days.

(21) Appl. No.: 16/673,333

(22) Filed: Nov. 4, 2019

(65) Prior Publication Data

US 2021/0134263 A1     May 6, 2021

(51) Int. Cl.
*G10L 13/00* (2006.01)
*G06F 16/958* (2019.01)
(Continued)

(52) U.S. Cl.
CPC .............. *G10L 13/00* (2013.01); *G06F 3/167* (2013.01); *G06F 16/986* (2019.01);
(Continued)

(58) Field of Classification Search
CPC ....... G10L 13/00; G06F 3/167; G06F 16/986; G06F 40/205; G06F 40/143; G06N 5/04; G06N 20/00
See application file for complete search history.

(56) References Cited

U.S. PATENT DOCUMENTS 7,698,131 B2    4/2010   Bennett
9,412,394 B1    8/2016   Yuasa et al.
(Continued)

FOREIGN PATENT DOCUMENTS

KR    1020140015228 A1    2/2014

OTHER PUBLICATIONS

"Browsing the Web from a Speech-Based Interface" Published Jul. 2001, describing Voice Browsers represent the class of products via a Browser Interface . . . [9 Pages] (Year: 2001).*
(Continued)

*Primary Examiner* — Quoc A Tran
(74) *Attorney, Agent, or Firm* — Alain Villeneuve; Duane Morris, LLP

(57) ABSTRACT

The present disclosure relates a new platform and system for the transcription of electronic online content, such as a website, from mostly visual/text format normally seen on screens to a different audio-adapted format for being broadcasted to the user via an intelligent speaker system, such as the Echo® system. More specifically, the platform and system includes an automated engine with artificial intelligence and machine learning for the transformation of written websites into to audible-enable content for use in association with new technology intelligent speakers, for implementing data mining, processing, and summarizing tools. The system primarily relies upon a capacity to diagnose, recognize template-like patterns in html format to create different levels of importance to the content stored online. Once content is triaged, it then is given processed in one of many way to help deliver and render useful content based on one of many features. Further areas of applicability will become apparent from the description provided herein. The description and specific examples in this summary are intended for purposes of illustration only and are not intended to limit the scope of the present disclosure.

7 Claims, 7 Drawing Sheets

(51) Int. Cl.
    *G06N 5/04*      (2006.01)
    *G06F 3/16*      (2006.01)
    *G06N 20/00*     (2019.01)
    *G06F 40/205*    (2020.01)
    *G06F 40/143*    (2020.01)
    *G06F 17/00*     (2019.01)
(52) U.S. Cl.
    CPC ............. *G06F 40/205* (2020.01); *G06N 5/04* (2013.01); *G06N 20/00* (2019.01); *G06F 40/143* (2020.01)

(56) References Cited

U.S. PATENT DOCUMENTS

| | | | |
|---|---|---|---|
| 2011/0145214 | A1 | 6/2011 | Zhang et al. |
| 2011/0286586 | A1* | 11/2011 | Saylor ............... H04M 1/72436 379/88.13 |
| 2016/0170710 | A1* | 6/2016 | Kim ........................ G06F 3/013 704/275 |
| 2017/0161018 | A1* | 6/2017 | Lemay ................ G06F 16/9562 |
| 2018/0204563 | A1 | 7/2018 | Liang et al. |
| 2019/0196675 | A1* | 6/2019 | German ................... G09B 5/06 |
| 2019/0214024 | A1* | 7/2019 | Gruber ................... G06Q 10/02 |
| 2021/0358500 | A1* | 11/2021 | Ward ..................... G06F 9/4843 |

OTHER PUBLICATIONS

International Search Report and Written Opinion, PCT. Application o. PCT/US2020/058871; dated Feb. 24, 2021.

* cited by examiner

PLATFORM AND SYSTEM FOR THE AUTOMATED TRANSCRIPTION OF ELECTRONIC ONLINE CONTENT FROM A MOSTLY VISUAL TO MOSTLY AURAL FORMAT AND ASSOCIATED METHOD OF USE

FIELD OF TECHNOLOGY

The present disclosure relates a new platform and system for the transcription of electronic online content from mostly visual/text format to an aural format adapted for being read by an intelligent speaker system, more specifically an automated engine with artificial intelligence and/or machine learning for the transformation of written websites into to audible-enable content for use in association with new technology intelligent speakers, for implementing data mining, processing, and summarizing tools.

BACKGROUND

In or around 1996, what we know today generally as the "Internet" began to take form. As part of this online and digital structure being collectively built, millions of websites (content) began populating a digital network of servers connected via ground or wireless networks and electronic communications began to flow. Today, the internet as a whole is a powerful tool for electronic commerce, trade, advertising, and all other forms of communication too numerous to describe or explain. It is clear with time, every piece of equipment will slowly be connected to the internet in what is often called 'the internet of things.'

HTML/URL Basic Functions

The "old fashion" way to build a website was simply to write computer code using a coding tool and programming using the Hypertext Markup Language (HTML). These text pages of coding are then given the extension .html or .htm before they are stored on a server with addresses connected to the internet. The 'home page' is connected and uploaded at the purchased address (e.g. www.testingtheweb.com) and all other pages of the website would then be structured in a tree-like architecture in menus and directories as subdirectories with the same stem (e.g. the same starting Uniform Resource Locator (URL)). A 'website' includes these .html pages but also content like image files, video files, and other links are also stored in a remove server. Over time, websites also have come to add and rely upon multiple types of added features and functions often driven by small software engines, for example Java Applets.

A user's work station is equipped with a web browser to decipher the html code and run small programs like these Java Applets. The local software located on a reader's computer runs the uploaded remote instructions via any network, then executes locally the html code to display images, sounds, videos and dynamic links to recreate the pages on the web. These browser's primary function is simply to display and transform the html coding into content digestible by the user. Currently, the latest version of HTML is HTML 5.2 published as a W3C Recommendation on Dec. 14, 2017. HTML is very broad in that it today includes HTML4 variations like SGML-based or XML-based HTML (XHTML).

Automated Website Building Tools

To help users create the above-described websites and their multiple web pages, tools like WordPress®, Wix®, Shopifi®, or Squarespace® can be used. WordPress® is used by 33% of the top 10 million websites as of April 2019. This content management system (CMS) is based on Hypertext Processors (PHP) and a database source management (e.g. MySQL®) and is designed with an interface that includes a plugin architecture and a very elaborate template system.

A template generally is a file of some type that serves as a starting point for a new document. When a person opens a template, it may be pre-formatted in some way. For example, word processing will create a template for a business letter placing information like the recipient's address, the company's logo, etc. at certain key locations and with certain key formatting features. Often, the use of templates in computer science requires the opening by any software of the template file, adding information to the template file and then saving the file as a new document with a new name.

The inventor places these 'templates' as one of the key inventive understanding of the invention. To understand these systems designed to help build websites at a faster pace, using a domain (URL) and a hosting service, WordPress® allows a user to quickly create and publish a new populated webpage. WordPress® uses macro-sets of templates or "themes" and requires a user to select one as the basis for the construction of the website. Each "theme" can be analogized generally to a trend or even a trade dress where it generally sets forth a flavor and color for the website as a whole. Themes can be developed independently, offered for free or for a cost, or also be broken down in subthemes also called "child" themes. For example, one "theme" could be "restaurant" to offer a set of websites to a person wishing to open a new restaurant and create a website for this new service.

The software may also include "sub-themes" designed to further scroll down in the wide nebula of templates. For example, the "theme" restaurant could offer (a) templates linked with a food cart, (b) with a catering business, (c) a stand-alone restaurant, (d) a franchise, (e) a retail restaurant, etc. For example, a restaurant located in a food truck would have unique needs (i.e. location of the restaurant using a GPS Applet) which a standard restaurant would not have (i.e. a fixed location of the restaurant using available mapping tools).

WordPress® also includes an elaborate system of plugin software, such as Applets each giving new functions. These plugins can serve purposes like a new search engine optimization, a new client portal, manage content, new navigation bars, etc. These plugins are created using a "hook system" consisting of action hooks and filter hooks as part of a total of 300+ hooks. (New Invention a plugin).

Many people know these different systems simply using a "click & drag" interface. To customize a website, once a template is selected (e.g. restaurant template), then several functions are added to the site. Images from the location can be dropped in place as background and pages along vertical tabs can be populated on demand (e.g. catering, menu, reservation, etc.). In the above example, a user would select a food distribution theme and then add a plugin to add text-based reservation at the door from the website. These systems create html pages and stores content.

The inventor of the current invention understands the notion that automation of webpage generation today creates is a firth pathway where artificial engines can connect. Using these different software and tools, the structure of the information created as a coherent hole. These tools structure content and also allow for update of content to follow some regular structure.

Voice Enabled Devices

In addition to understanding the general technology linked with website designs and structure, in tandem with the development of the classic internet, simpler and more intuitive interfaces are being developed to help users of technology better manage these products and systems. For example, refrigerators or even cars which once were simple mechanical devices operating directly from a power outlet or an engine, now have onboard technology of many type. This includes multiple processors and user interfaces like keyboards, screens/displays, and electronic touch screens to help users get additional functions from these devices.

As one can easily understand, even the simplest of physical interface requires learning and knowledge to operate. For example blind people, children or the elderly may wrestle with even the most simple of interface. This is made even more problematic as every piece of equipment around a person's living environment is now being equipped with these additional functionalities and digital interfaces. In a kitchen, a person must learn one interface to prepare coffee, another interface to manage the refrigerator, and one last interface for order milk.

Home automation systems which were once rather simple have over time become more complex. One easy solution is to use what is called an integrated system, like a single-hub that manages multiple pieces of equipment but programming such systems initially results in only creating an additional layer and compounding the problem. One very well known example of integrated system is the "universal remote control" for a television. With time, more devices appeared next to the television (e.g. a gaming console, a storage system, etc.). From one simple remote control with a couple of buttons, the interface became so complex hundreds of buttons or digital screens began to appear on each remote. At some point, the solution became to add a new additional remote that could be programmed to "replace" all other remotes. But this integrated system proved even more complex than the initial commands and over time such improvements were left for the truly passionate. Even today, most households have complex navigation systems for something as basic as a television.

Recently, another solution is to integrate in a user's cell phone using software (e.g. Apps). Once again, this solution suffers from the same problems as those it is trying to be resolved. It often adds to the complexity, requires experts to set up the system and upon any complex change, the system falls and cannot be used. The inventor's solution to these problems is linked with the use of voice enable devices.

Voice-User Interfaces (VUI) makes it possible to have spoken audible human interaction with a computer. By VUI what is also contemplated is both an oral and a written equivalent of a voice for those unable to hear or located in an environment where hearing is not possible. Using speech recognition to understand spoken words, then translated into spoken commands, speech (audio) can be transformed into audio files (e.g. .wav files) or text to generate a response from a system. Most VUI include a two way communication that includes (a) a microphone for input of the information to the computer, and (b) a speakers able to transform electrical impulses into audible sound back to a user. As part of phases (a) or (b) the communication can also be one-way audio and one way visual, for example when a person speaks to a cell phone and the system responds by performing functions in the software and displaying information. Another known VUI having a single (a) aural and (b) non-aural is the television remote control system where a user speaks into the remote and the system returns the proper information. Generally speaking, the interface is better designed as a two way audio (i.e. speaking to the device and having the device respond using a voice).

Recently VUI have been added to automobiles, home automation systems, computer operating systems, home appliances, or even television remote controls. New VUI systems also use stronger voice recognition systems that include software designed to adapt to single users as they use the system frequently, systems to understand dialectal influences or accents from foreigners. These systems also have algorithms to filter the voice and sound heard to help people talk in noisy environments. Most computer systems (Windows Vista®, Windows 7®, Mac OS X®) come with some versions of VUI. Mobile devices also come with VUI of some type as part of the Android® operating system.

In 2014, Amazon introduced a smart home device called Alexa® aka the Amazon Echo®. The device originally simply designed as a smart speaker was baptized and given an identity. The same technology was installed as SIRI® by the Apple corporation on cell phones and computers. Cars also are now connected to CNET which allows for use of voice and entry of information in other related products like a GPS or a Garmin®. The current invention is designed for use by any VUI system or device connected to the Internet. Echo devices connected to the voice-enabled intelligent personal assistant service called Alexa. This system is rather new as it was mostly introduced in 2015-2016.

These devices are given features and functions of multiple types. For example, music playback, to-do lists, setting alarms, streaming podcasts, playing audiobooks, providing weather, giving traffic and other real time information. This device can also control smart devices found in a location such as a home automation hub. The current invention is designed to interface with most voice enabled devices and with great particularly to devices such as Amazon Echo®.

Devices like the Echo have a default mode of continuously listening to speech using microphones calibrated with their surroundings. They constantly try to distinguish sound and recognize one of a set of key speech keys spoken by any individual in the room. Microphones can be manually disabled by simply pressing a mute button designed to simply cut the audio processing circuit. These devices have a wireless connections for connection to the internet and in the case of Alexa® it connects to the Amazon Web Services.

Currently, a handful of useful services are available to devices like the Echo. Most of the websites and web pages found on the internet remain hidden from these devices. The purpose of the current invention is to rely on multiple layers of technology to help transform millions of websites and their web pages in content that can be processed using one of the devices like the Echo.

The purpose of the current invention is to bring the internet and other digital content more accessible to all users by trying to shorten the bridge between a user which is situated in the real world, away from a classical keyboard/digital interface and the sea of content being generated on a daily basis. In addition, the goal of the current invention is to create new technology designed to perform in the fraction of a second a live or delayed translation from a fully digital/written content to an aural/captioned content of the fully digital/written content in a cost efficient way.

For example, FIG. 1 of the current disclosure is taken from the prior art as the FIG. 21 of U.S. Pat. No. 9,318,108 titled Intelligent Automated Assistant invented by Gruber et al. and owned by Apple Inc. This 2010 patent helps understand how an intelligent automated assistant system engages with a user in an integrated, conversational manner using natural language dialog, and invokes external services when appropriate to obtain information or perform various actions. The system can be implemented using any of a number of different platforms, such as the web, email, smartphone (as shown at FIG. 21), and the like, or any combination thereof. In one embodiment, the system is based on sets of interrelated domains and tasks, and employs additional functionally powered by external services with which the system can interact. This patent teaches how the Alaxa®/Echo® generally functions and is incorporated herein by reference.

FIG. 2 is one of the thousands of pieces of art related to the art shown above and is titled Systems and Method for Automatically Configuring Machine Learning Models as WO 2019/172868. It describes a new system to circumvent the "rules" based system used in the Echo® system above replacing it with one type of more modern artificial intelligence.

What is needed is a new type of technology designed to create and describe a new platform and system for the transcription of electronic online content from mostly visual/text format to an aural format adapted for being read by an intelligent speaker system, more specifically and automated engine with artificial intelligence for the transformation of written websites into to audible-enable content for use in association with new technology intelligent speakers, for implementing data mining, processing, and summarizing tools.

SUMMARY

The present disclosure relates a new platform and system for the transcription of electronic online content, such as a website, from mostly visual/text format normally seen on screens to a different audio-adapted format for being broadcasted to the user via an intelligent speaker system, such as the Echo® system. More specifically, the platform and system includes an automated engine with artificial intelligence and machine learning for the transformation of written websites into audible-enabled content for use in association with new technology intelligent speakers, for implementing data mining, processing, and summarizing tools. The system primarily relies upon a capacity to diagnose, recognize template-like patterns in html format to create different levels of importance to the content stored online. Once content is triaged, it then is given processed in one of many way to help deliver and render useful content based on one of many features. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is an image from the prior art, namely FIG. 21 of U.S. Pat. No. 9,318,108 titled Intelligent Automated Assistant invented by Gruber et al. and owned by Apple Inc. where numbering is taken from the prior art and is not relevant to the current specification and is simply reproduced to maintain accuracy with the prior art.

Corresponding reference numerals indicate corresponding parts throughout the several views of the drawings.

DETAILED DESCRIPTION

Example embodiments will now be described more fully with reference to the accompanying drawings.

Hardware

As described below, the current system and platform, while mostly software reside on hardware in one of multiple pieces of a system. Since some materiality must be shown in association with the new system, a handful of elements are shown. The computer/software layer must be secure, reliable, and easy to maintain. Shown at FIG. 3 is one of numerous potential hardware configurations capable of hosting and executing the platform and system and for executing method of use linked thereto as described herein.

Figure 1:
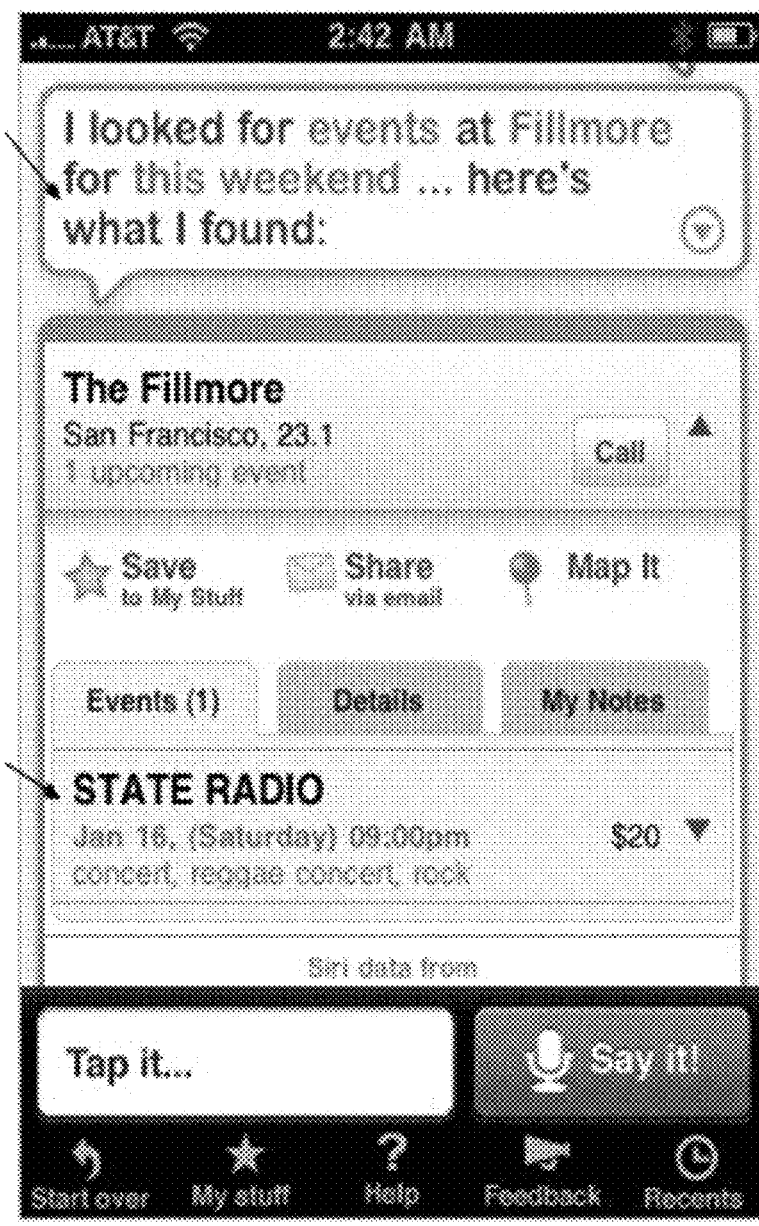
Figure 2:
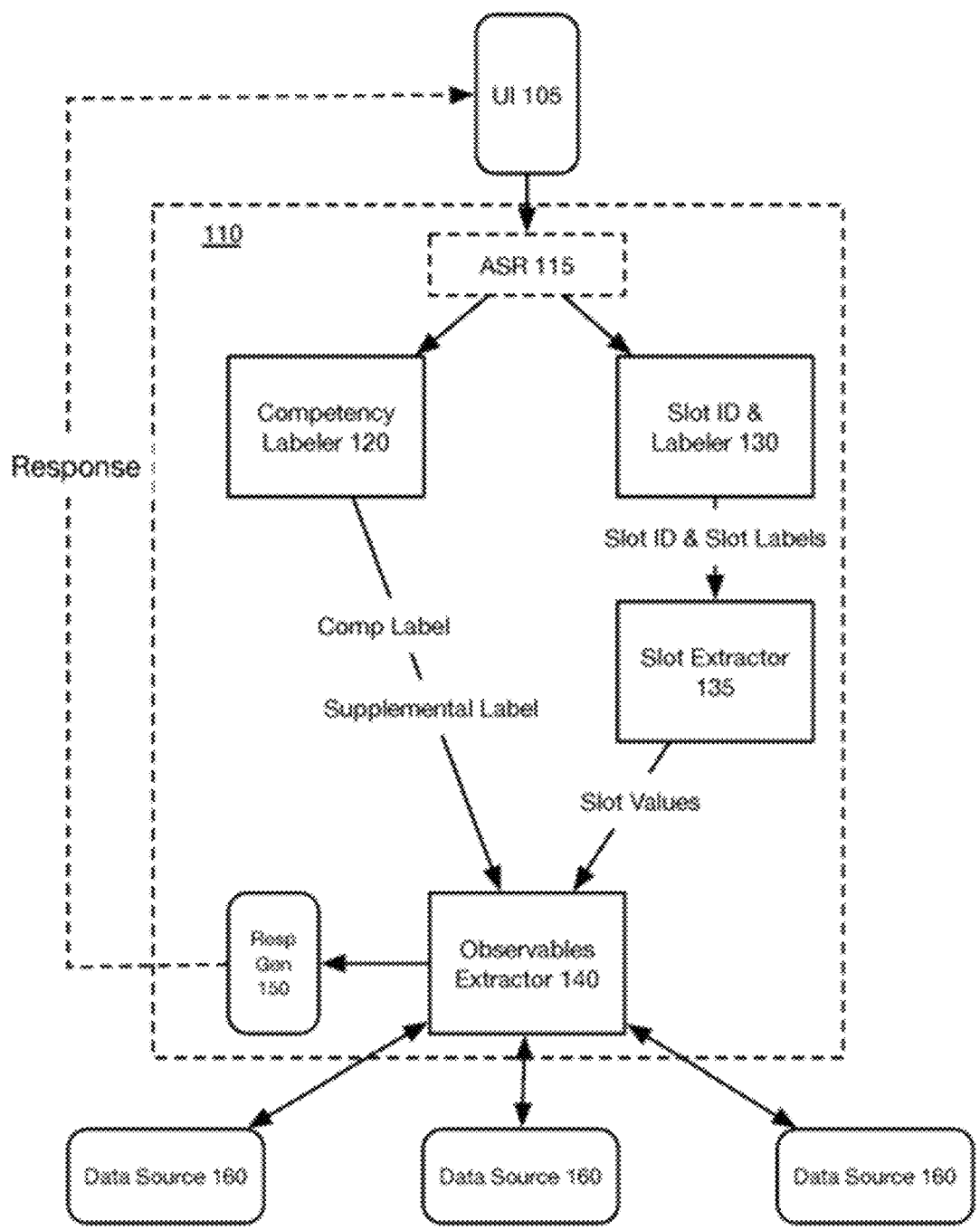
FIG. 2 is an image from the prior art, namely FIG. 1 of WO 2019/172868 titled Systems and Method for Automatically Configuring Machine Learning Models where numbering is taken from the prior art and is not relevant to the current specification and is simply reproduced to maintain accuracy with the prior art.
Figure 3:
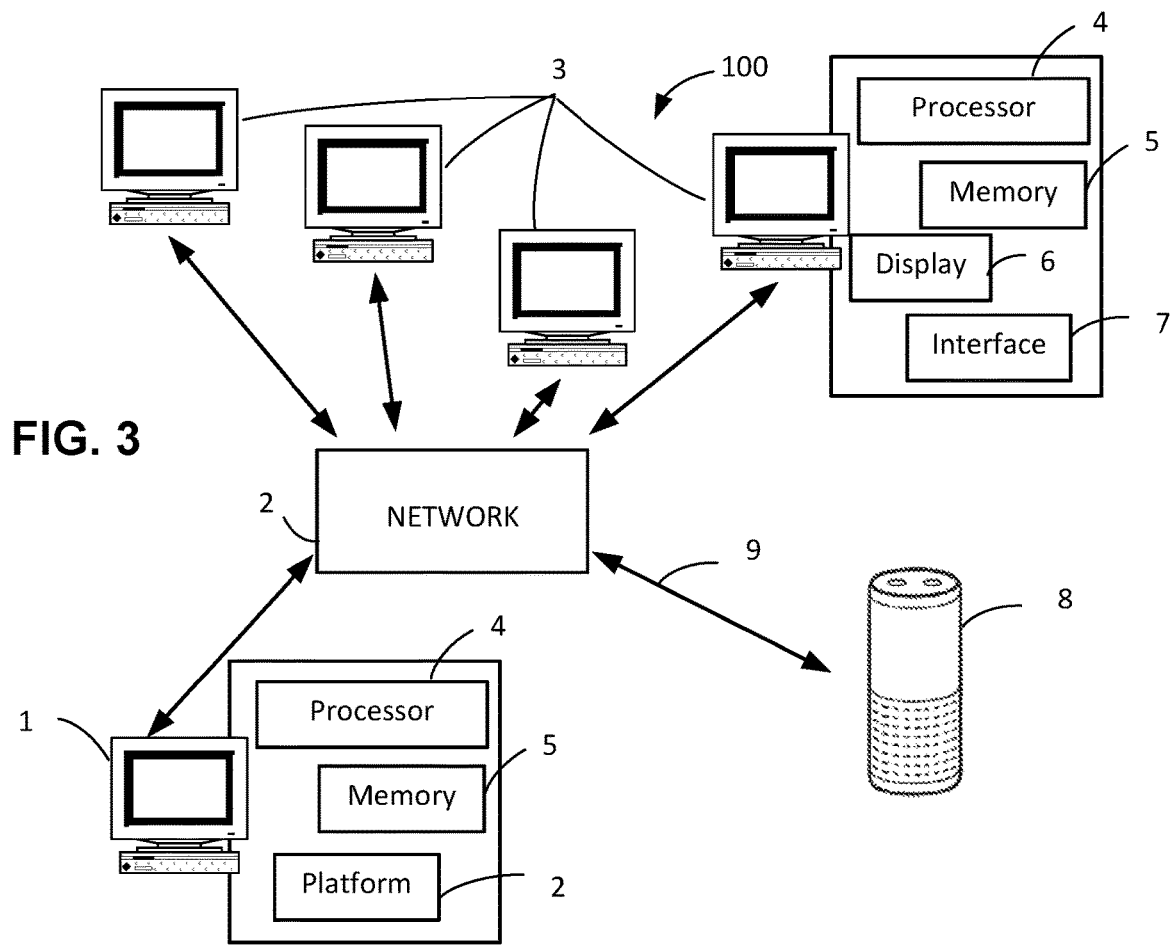
FIG. 3 illustrates possible hardware elements that support a platform and system for the transcription of electronic online content from a mostly visual to an aural format according to one embodiment of the present disclosure.

In its simplest and most secure configuration, FIG. 3 shows a system 100 with remote server 1 or any other type of computing device connected either wirelessly, via landlines, or in any way to a network 2, such as, for example the internet and/or a wireless cell phone system with or without data. As shown today, a plurality of personal computers 3 such as Personal Computers (PC's), laptops, hand held devices like a tablet, a web-enabled phone, or any other web-enabled device each generally are built with a computer processor 4 are in turn connected to the network 2.

Figure 5:
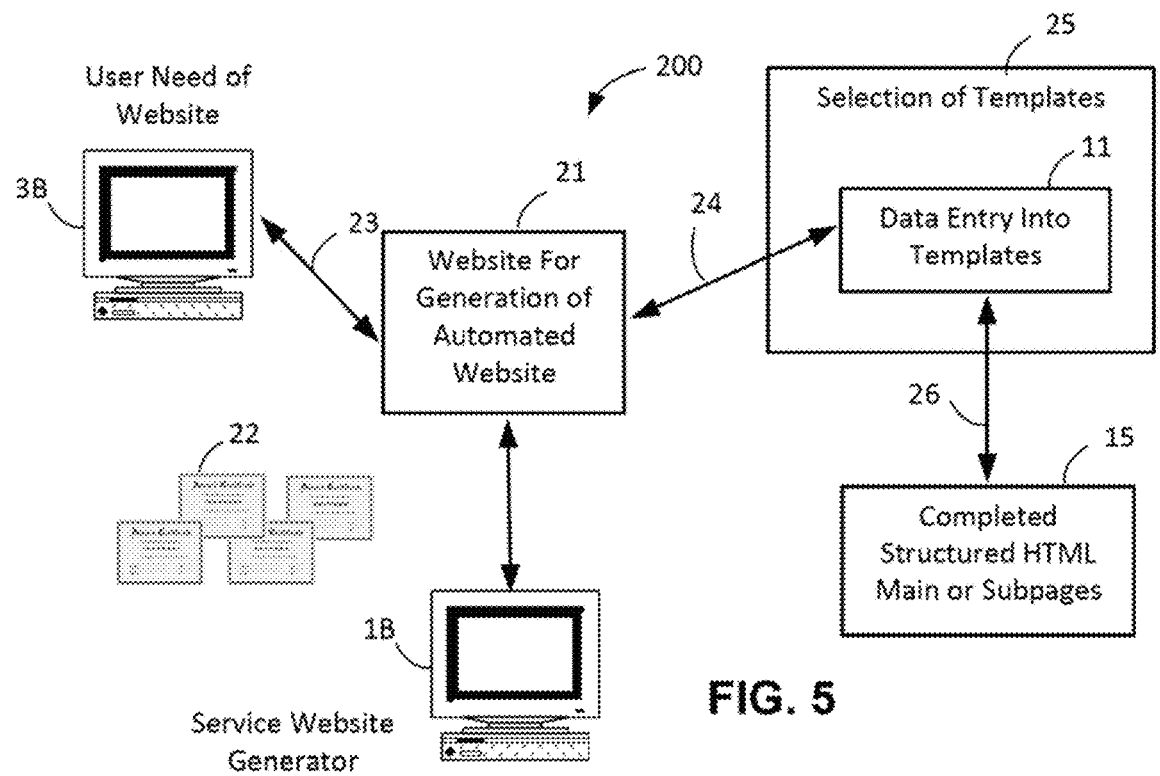
FIG. 5 illustrates the dynamic elements of the system for crating using templates websites.

The server 1 or the personal computers 3 can broadly be described as having a processor 4 each connected to a computer memory 5 designed to operate in tandem with the processor 4 to execute several layers of software needed for operation (e.g. operating system, bios, internet, etc.). In addition, most devices 1, 3, have a display 6 for use. Such display 6 is generally found on the server 1 but is not absolutely needed. The personal computers 3 do in fact require some type of computer display 6 connected to the computer processor 4 for interaction with potential users using the platform 100 hosted in the hardware shown at FIG. 3. The display 6 helps the user navigate over a software interface 7 as shown at FIG. 5 to display different information in the computer memory 5 by the computer processor 4 over the interface 7.

Within the scope of this disclosure, the term computer display 6 includes more than a screen or other visual interface, the term display is designed to include any interface capable of interacting with a person, whether visual, oral, touch, or any other interface. A personal computer 3 also includes running as part of the memory 5 and displayed on the computer display 6 an interface 7 and is connected to the computer processor 4. In one embodiment, the processor 4 executes an operating system (not shown) and an associated HTML web-enabled browser (not shown) capable of displaying to a user using the platform 100 residing on a network enabled server 1 connected to a network 2 like the World Wide Web also called commonly 'the Internet.' The term network is used as part of this disclosure and encompasses broadly any type of computer network, over hardware, software, or wireless such as for example a Local Area Network (LAN), or any other network where the platform can be found.

Also illustrated at FIG. 3 is an intelligent speaker device 8 built with a connection 9 to the network 2 and having, for example (not shown at FIG. 3) a speaker and a microphone connected to the device's processor 4, memory 5. In sum, the device's 8 interface is aural and not visual in this context. The device 8 as shown can be stand alone device that can be placed in various environments such as workplaces, stores, schools, commercial locations, homes and the like. In other examples, the device 8 can reside as part of another device such as a mobile phone, kiosk, workstation, tablet, laptop, car or other computing device.

The Generation of Websites

Figure 4:
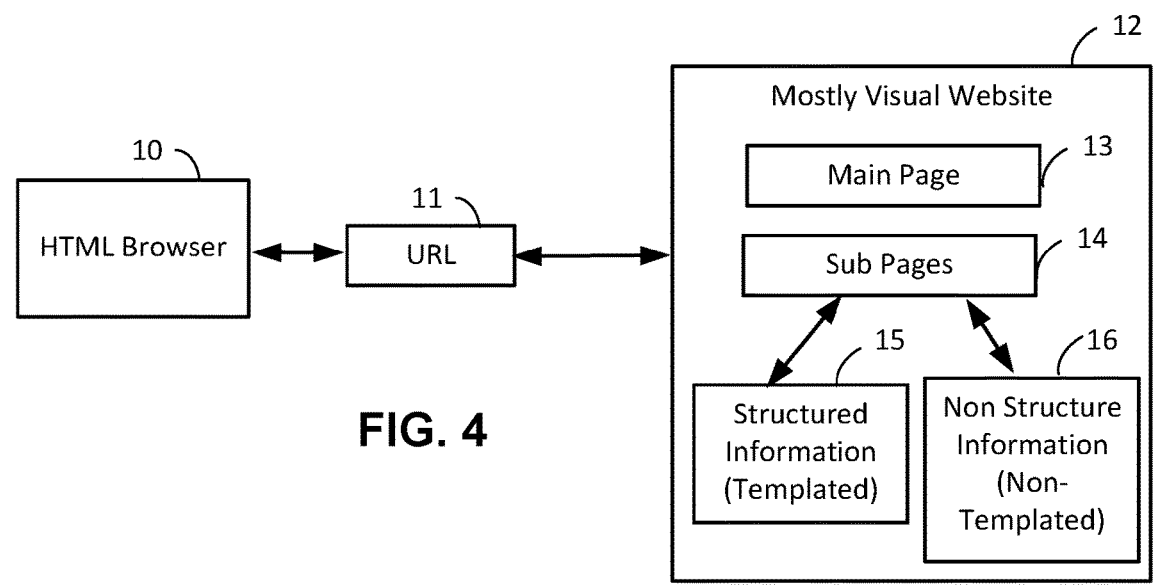
FIG. 4 illustrates the structure of websites generally according to an embodiment of the present disclosure.

FIG. 4 shows how a HTLM Browser 10, located on any of the devices 1B, 3B, shown at FIG. 3 can be used to connect via a Uniform Resource Locator 11 to one of any websites 12. As shown, while webpages and websites are very complex, they generally include a main page 13, multiple subpages 14 often created in the form of menus. In this invention, the inventor recognizes either structured information in pages 15 and non-structured information 16.

By structured information, the inventor recognizes that HTLM data forming both the main page 13 and the multiple subpages 14 can have recurring and structured content generated by one or more systems for the creation of these pages 13, 14. As shown at FIG. 5, one such system 200 can include a website 21 for the generation of automated webpages or the use of templates 22 or themes (e.g. sets of templates). As shown WordPress® for example, the user surfs the web using the system shown at FIG. 3 and reaches 23 the website 21 and then will select 24 themes or templates 25. The inventor recognizes that in cases where some information of websites is structured 15, this structure is the basis for the analysis of and determination of relevance of content for use in the next part of the invention.

These templates are generally understood as pages of code (HTML code) which have been pre-programmed with certain elements, formatting, functions which will remain common. A user will simply select the template 25, then enter information 26 (i.e. images, text, or other content) which is then slid by the website 21 system for the creation of finished webpages for use in the website as shown at FIG. 4.

Today the concept of software operating within hardware is migrating away from this fixed structure. Cloud computer and data storage allows multiple interconnected hardware elements like cell phones, wireless tablets, portable computers, and even onboard memories to act as part of larger data structures and systems. While one hardware configuration is shown as the current preferred embodiment, one of ordinary skill will recognize that with time, there will be a migration away from these simple structures. For example, new software platforms may allow the different actors to retain locally control over some issue. The following technology is not limited to one hardware configuration.

The Platform in Use

Figure 6:
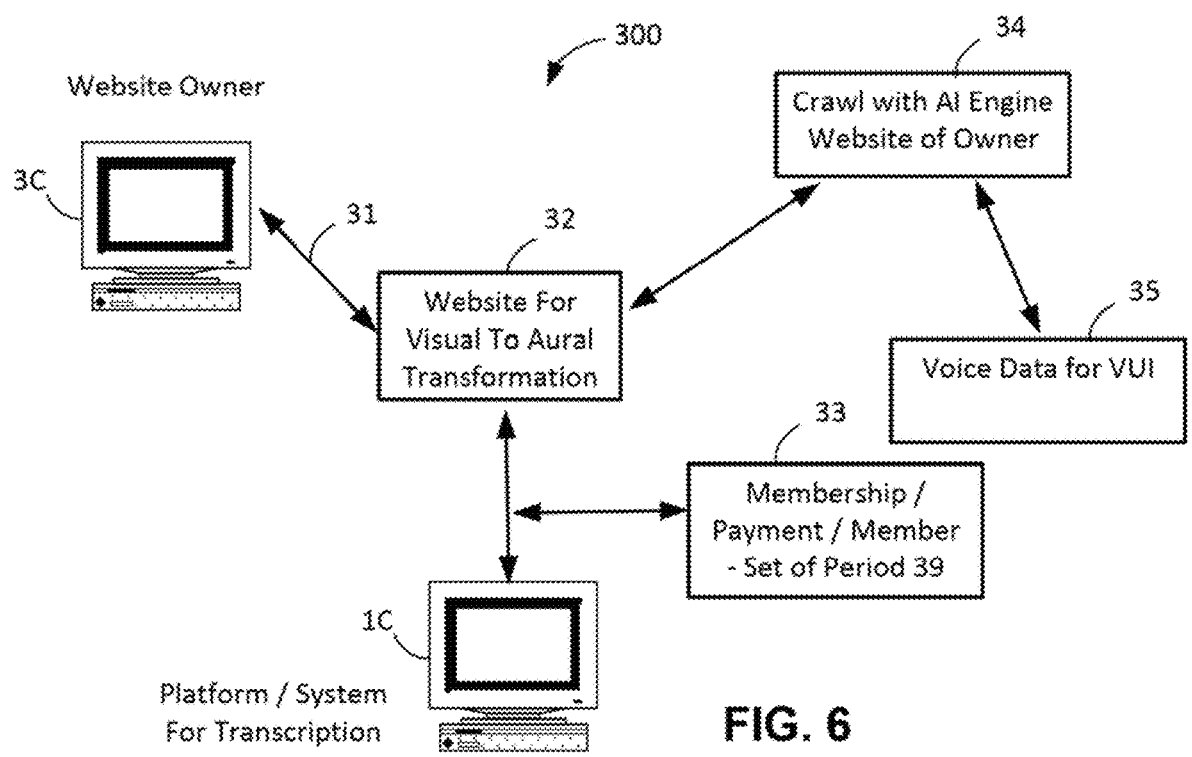
FIG. 6 illustrates the dynamic elements of the system linked with transforming a website from a visual to an aural format according to an embodiment of the present disclosure.
Figure 7:
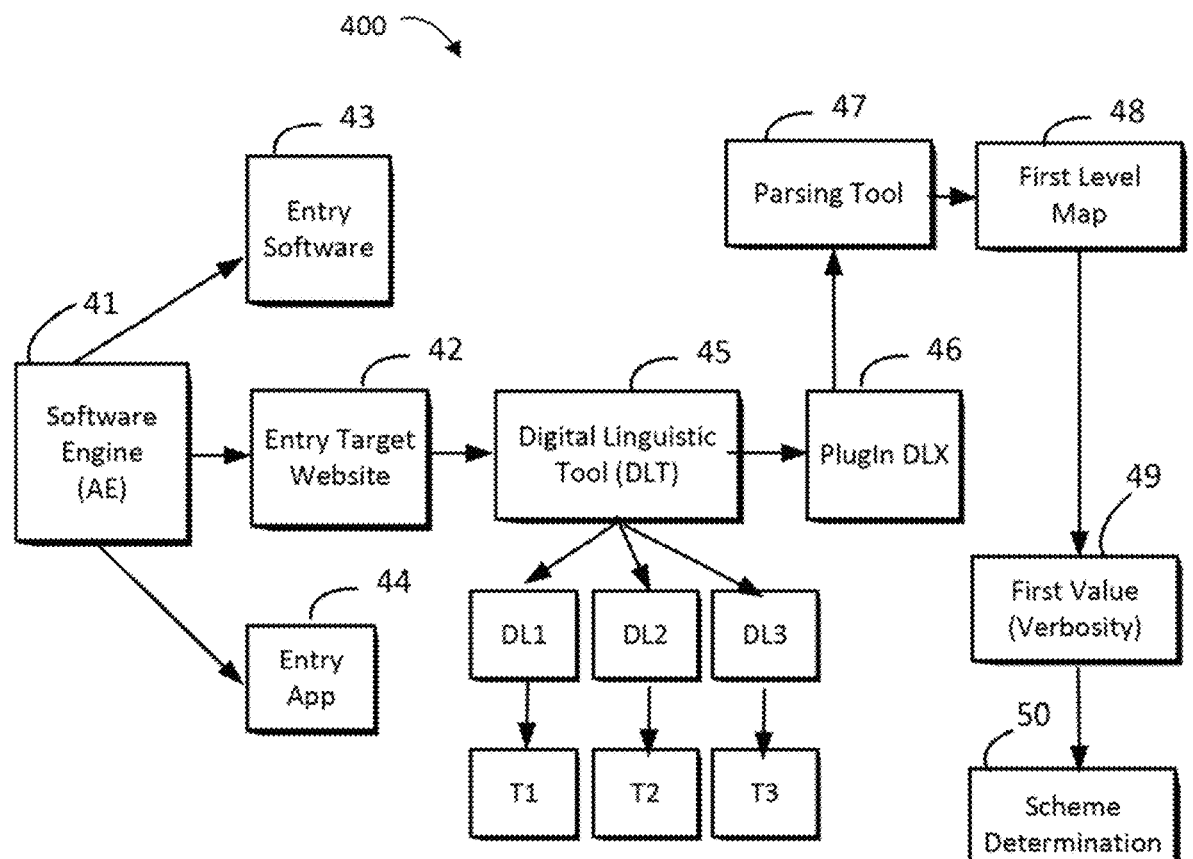
FIG. 7 illustrates the different elements and phases of the Artificial Intelligence Software Engine linked with the platform and system for the transcription of electronic online content from a mostly visual to an aural format according to one embodiment of the present disclosure.
Figure 7:
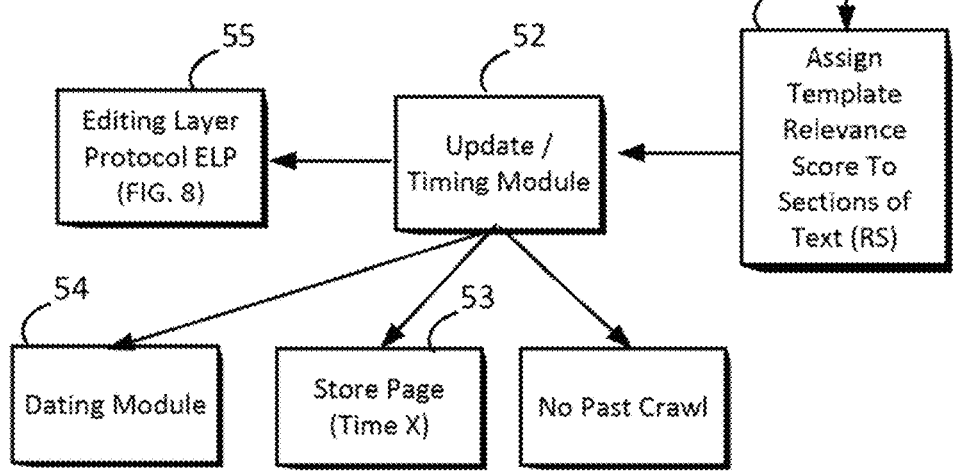

While FIG. 5 shows the process linked with a user in need of a website 3B and using, sometimes the services of a provider 1B, FIG. 6 shows a different configuration of users 3C and service provider 1C using generally the hardware shown at FIG. 3 but this time the user 3C is a website owner (for example one who used the system shown at FIG. 5) and who operates one or more websites over a network for other users as generally shown at FIG. 3.

As shown 300 the website owner 3C logs into 31 a website for visual to aural transformation 32. The system is managed by a service provider 1C that offers classical services 33 like a membership, the payment system and the setting of one of multiple levels of visual to aural transformation 39. For example, in one embodiment, the system sets a periodic crawl of the website 34 and the generation of aural data structured for processing via a VUI interface 35.

For example, if the website is a simple restaurant with low temporal variability (i.e. the menu changes only once a month), the service offered can be set to crawl 34 only when the user make a request 31 or at a low period (e.g. 1 month). If a website is organic and dynamic like a newspaper, the crawl 34 can be set by the software to happen at a higher frequency (e.g. 1 day). Computers offering enhanced performance over time, it is conceivable that such low period v. higher frequency values will shorten over time.

Artificial Intelligence

The term Artificial Intelligence (AI) is used very broadly in today's parlance. At its broadest understanding, generally held by the non-scientist, it represents simply some type of sentient entity, or human intelligence embedded in some type of digital media. To most ordinary humans today, there is a broad belief that with time and effort, a human persona will ultimately be recreated in a digital world using simple computer coding.

At its narrowest understanding, AI is often seen as terminology to replace sophisticated automated computer algorithms that replace or mimic human intelligence or human action. To these scientists, if something "acts" like a human intelligence, it can be called artificial intelligence. As part of the current specification, the term AI represents the narrow understanding in that described hereafter are steps, processes, algorithms, templates, filtering tools each designed to mimic human logic and intelligence.

While it can be designed differently, in one current embodiment, this new platform and system described broadly in action at FIG. 6 bypasses the need for use of either the Echo®/Alexa® system and its reliance on proprietary services like the Amazon Web Services®. The system 400 includes an online Web Platform generally as the site where software operates. A user, after securing a monthly membership or other type of free of for payment access as shown at FIG. 5, will log into a Software Engine 41. The user simply enters a target website 42 for processing, for example a URL (www.visualorigintal.com) where the desired target is residing on a server, a cloud-based server or any other location.

In a different embodiment, other targets are entered such as an operating software 43, an App 44 or even other sources (not shown). Using the Software Engine 41, the Artificial Engine (AE) initiate a first scanning phase of the target 42, 43, 44. While no access to the Echo/Alexa system is needed to transform the target 42, 43, 44, one of ordinary skill in the art understands the transformation from the Artificial Engine AE generally will produce content for use by the Echo/Alexa or any other VUI enabled systems.

The Artificial Engine AE includes a Digital Linguistic Tool (DLT) 45 designed to help the system recognize and understand any webpage created using one of numerous automated system. For example, the DLT 45 can have a first Digital Language DL1 for WordPress®, a second DL2 for Wix®, a third DL3 for Shopifi®, a fourth DL4 for Squarespace® or for any type of structured set of website instructions. For the DLT 45 to select DL1, DL2, etc. it must be given or uploaded Templates T1, T2, T3 from each of these respective systems. As shown at FIG. 6, these sets of website instructions can be imported or crawled into the DLT and stored with a pattern recognition tool.

In one embodiment, each of the series of T1, T2, and T3 is compared with the entry target website HTML text. The text is simply taken in pieces and indexed for similarity. When a certain portion of the template matches, a determination is simply made (for example a template in T3) is matched and DL3 is then selected. Once one DL is selected, others are discarded. Not shown is the capacity to assigned an "non-recognized" value of DLT 45 when no DL is found.

As part of the second step, the AE 41 it uses the DL selected with the DLT 45 (if one is found) to assign a language to the website (e.g. this website was produced with WordPress®). Next, the current technology is designed to rely upon a new plugin, for example a WordPress plugin 46 designed to be launched after being given a target. While a PlugIn is described as the software function, one of ordinary skill in the art of software programming will recognize that any site which has a language or is programmed would require a "patch" or an Applet having similar functionality.

The system then scrubs (compares two files) the target website and the associated set of web pages using a parsing tool 47 to conduct a first broad brush of the website as a whole to generate a first level map 48. Once a type of map is found, the system will assign a first value 49 of oral translation. For example, some websites are particularly adapted to be translated from textual to aural content like media websites or websites with little text below images. These sites, once recognized by the parsing tool 47 would assign a value of translation 49 from VT=1 to 100 or any other related scaled value. A value of 100 would in principle set the highest value of translation hoping if possible to create a voice for each of the written words. In the other end of the spectrum, a website like the result site for marathon races, where thousands of words or numbers exist, if translated into voice content would result in only incoherent speech. For these, the VT=1 to 100 would be given a value of 1 signifying that on the page visual to aural translation should only be done in rare cases. The use of the First Value 49 is a broad indicator which allows to set generally the verbosity of the desired translation.

One the general type of website is determined, by the artificial intelligence engine, using a second scrub of the target website to diagnose the technology used (if any) to build the website and what types of templates/themes were used in the process 50. This second step allows the artificial engine AE to quickly understand the type of information it can expert and more importantly what information was manually entered or customized for this site.

For example, a template used to generate a website of a restaurant may have set data that is not personalized to this location. For example, the template structure of WordPress® may have automated footers, terms of conditions, headers, and titles like "menu" or "wine list" which is common in the template. Alternatively, data located after the "menu" would be specific data added by the person like for example specific important meals. For each template, the engine at this stage would apply a template where the information is given a "high important" to "low importance" and given a relevance score RS=1 to 100 or any other scaled version 51.

Third, the artificial engine AE 41 of the plugin will factor time as an important parameter to understand and evaluate what portion of the information is important and critical when compared to stale using a module 52. For example, most often new information is more relevant (i.e. recently added) when compared to older information. The same way automated robots archive webpages periodically (www.archive.org) where a crawler looks at the webpages at a periodic time (T1, T2, T3 . . . TN) and compares it with the last saved version on the system 53. If the newly crawled page (TN) is identical to the earlier saved one (T3), no information was added to the page and additional saving is not required.

The artificial intelligence plugin AE 52 would quantify the old information accordingly as a low importance. By analogy, when the new page (TN) is compared to the earliest saved one (T3), a portion may have been changed or altered. These portions will be information which was added between both periodic analysis phases are given a higher degree of importance. This time factor portion of the engine 52, also is designed to look specifically for dated materials 54 using a dating module. When dates are found next to any portion of information (e.g. press releases, daily specials, new clippings, etc.) the timing engine will flag them as more relevant. The timing engine will also assign different quantifiers for any information specifically dated for association by a user to key search words as "new" "update" or "latest" or "today."

Once the system has run the above several filters (and others), it then has an Editing Layer Protocol (ELP) 55. The ELP operates along the lines of the notion that while humans can quickly skip or scroll past useless information, the same information delivered by any oral means will be given sequentially and unless it is carefully managed will be too long and too burdensome to the person listening. The editor function is key to the artificial intelligence described herein in that its failure to select and manage the proper portions will quickly result in a user abandoning the application and failure. The ELP is described at FIG. 8.

Visual readers "read" at approximately 700 words a minute and auditory readers "read" at approximately 450 words per minute. Said differently, the speed of data digestion by a human using eyes is almost 60% greater than when ears are involved. This effect is compounded in the new area of digital information where cell phone users now can skip and skim at a much faster rate. The key problem with aural surfing of any webpage or any webpage is the slowing down of how information is conveyed, received and processed. In addition, most websites and webpages include imagery which is central to improving the overall surfing experience.

For any given process, platform or system to be successful and result in a comfortable use must "speed up" the delivery of information and also avoid providing information which useless or redundant information.

As shown above, at this point, in one embodiment, the AE 41 before it proceeds to translation of certain parts of the target website has: (a) secured and crawled the identity of the website target, (b) has determined if a Linguistic Tool DL 45 applied, and if so, had Templates in place linked with the way the website was created, (c) a Plugin DLX 46 is selected if possible, a Verbosity value is calculated 49, (d) next a RX value of Relevance was determined 51, and after (e) running the Timing Module 52, key information on the frequency and portions which have been (or not) recently updated.

In one step which can be bypassed after user input, the ELP 55 offers a set of surfing tools 56 designed to further help the system increase the flow of information being delivered. In one embodiment of the present invention, the inventor has programmed the plugin or the system to offer cues, for example include "jump" cues to allow auditory readers to simply say one or two words like "jump" "got it" or "what's next" to allow for the delivery of the information to skip ahead as if the user had visually jumped from the top of the page to the bottom. Sample aural text include:

"To navigate this website quickly, remember, just cut-in "jump" to move ahead thirty seconds, "got it" to just to the next Action Item of the website, or other synonyms." In addition, using the Timing Module information, a second tool 57 may be offered like: "This website had two key updates from [yesterday], to jump to them, simply say "recent.""

The ELP 55 then processed find and create a set list of Action Items 58 from the website (for example 10 items) where the number is set by the parameters above to create an aural menu 59 to help navigation. For example, "You have reached [ . . . target name . . . ] website, at the moment, we offer you the following [number] options . . . [list of Action Items]." In one embodiment, these Action Items include "skills" as defined in the famous Alexa® device.

In another embodiment of the present invention, the inventor has programmed the plugin to move up or down in the layers of information found in a page. For example, when visual text is displayed, an article will have bold or larger font text as headlines, will have normal text, and will have capitalized text to be focused. Most people understand larger fonts will be headlines (e.g. a more general level of information), the smaller fonts will be the normal level of information, and the smaller font some higher detail of information. Formatting tools also are used by the ELP 55 to help drill down and further improve the relevance of any portion of text to be transformed to an aural version.

Figure 8:
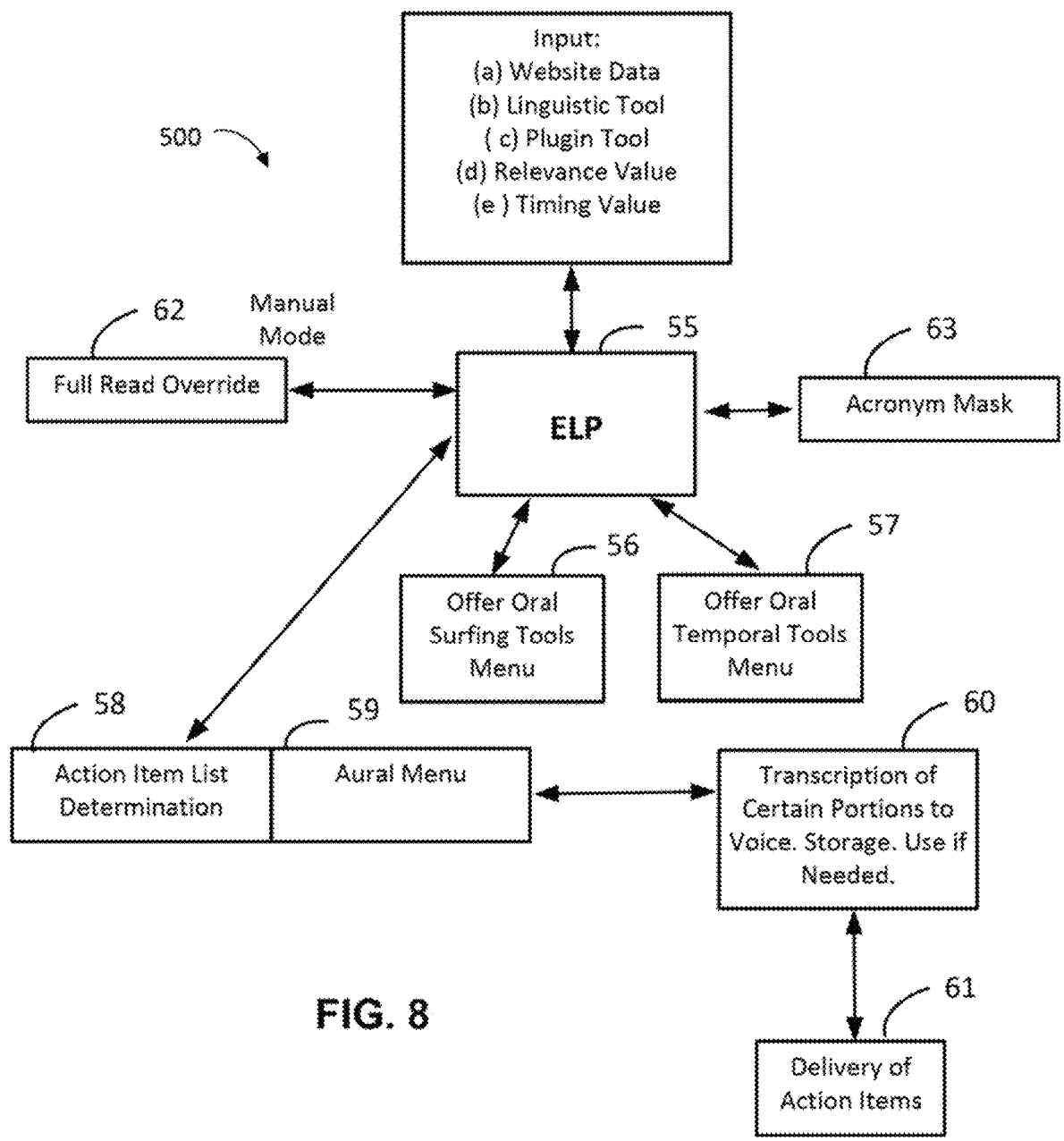
FIG. 8 illustrates further elements of the Editing Layer Protocol part of the Artificial Intelligence Software Engine linked with the platform and system for the transcription of electronic online content from a mostly visual to an aural format according to one embodiment of the present disclosure.

Once again, the inventor programs the plugin to recognize the scaling verbal cues "too much" to tell the system to stop giving it so much detail and if possible to provide higher font content or to the reverse to use "this is good" to slow down the reading. In one embodiment 62, a full override mode can be requested in the event the information required is a full read. The system as shown at FIG. 8, includes a transcription of certain portions 60 to voice, storage and use if needed. This is done before the delivery 61 of Action Items.

What is described above, is a system designed to create voice elements and action items and structure/deliver the information to a person over the normal internet or using any other tool on the internet. The information is stored in what the inventor describes as a "voice bucket" for later access and retrieval.

In addition, the inventor also provides for the creation of several new tools such as "flash briefing" designed to deliver the original visual content in an aural format. In another embodiment, the aural menu 59 can be focused on (a) news, (b) a selection of posts for further selection, (c) a selection of full content option, (d) a request for a certain type of content [e.g. all appetisers], (e) a full SSML support within the post content, (f) or a full utterances/intent schema provided as starting point to easily copy/past into the Amazon Developer console.

In another embodiment, the ELP 55 includes a tool 63 for the transformation of acronyms into full descriptions (e.g. DoT to be read as "department of transportation"). In other embodiments, other skills like "facts/quotes" can be defined to help connect topics or certain key facts with portions of the website for translation into Action Items 58. This tool can also serve multiple other functions, including the transportation of coupons, deals of the day, sales promotions, advertisements, resource management, indexing tools, transformation of newsletters, create games or quizzes (e.g. trivia).

In another embodiment, a website having icons like "Our Team" next to "Company history" and then "Contact Us" or "About Us" and other features like a calendar of events, several key videos or postings, client testimonials, and other content, the AI would use the ELP to translate into a set series of information for aural distribution. The same way data is entered in writing to these templated items, the entry would be derived as action items 61.

One of the types of XHTML is called Speech Synthesis Markup Language (SSML) used for speech synthesis applications. The SSML code is often embedded in VoiceXML scripts used commonly to drive interactive telephone systems. In addition to SSML, other systems include Apple's Embedded Speech Commands, or Microsoft's SAPI Text to Speech (TTS) markup. SSML is based on the Java Speech Markup Language (JSML) developed by Sun Microsystems. To name a couple of the pronunciation/speech specifications which define the grammar and other tools, some include SABLE the speech synthesis markup language intended to combine SSML, STML, and JSML, Pronunciation Lexicon Specification (PLS), Speech Recognition Grammar Specification (SRGS), and Semantic Interpretation for Speech Recognition (SISR).

The inventor uses SSML for example to generate automatically the content code using a formatting language.

The Method of Transformation

Figure 9:
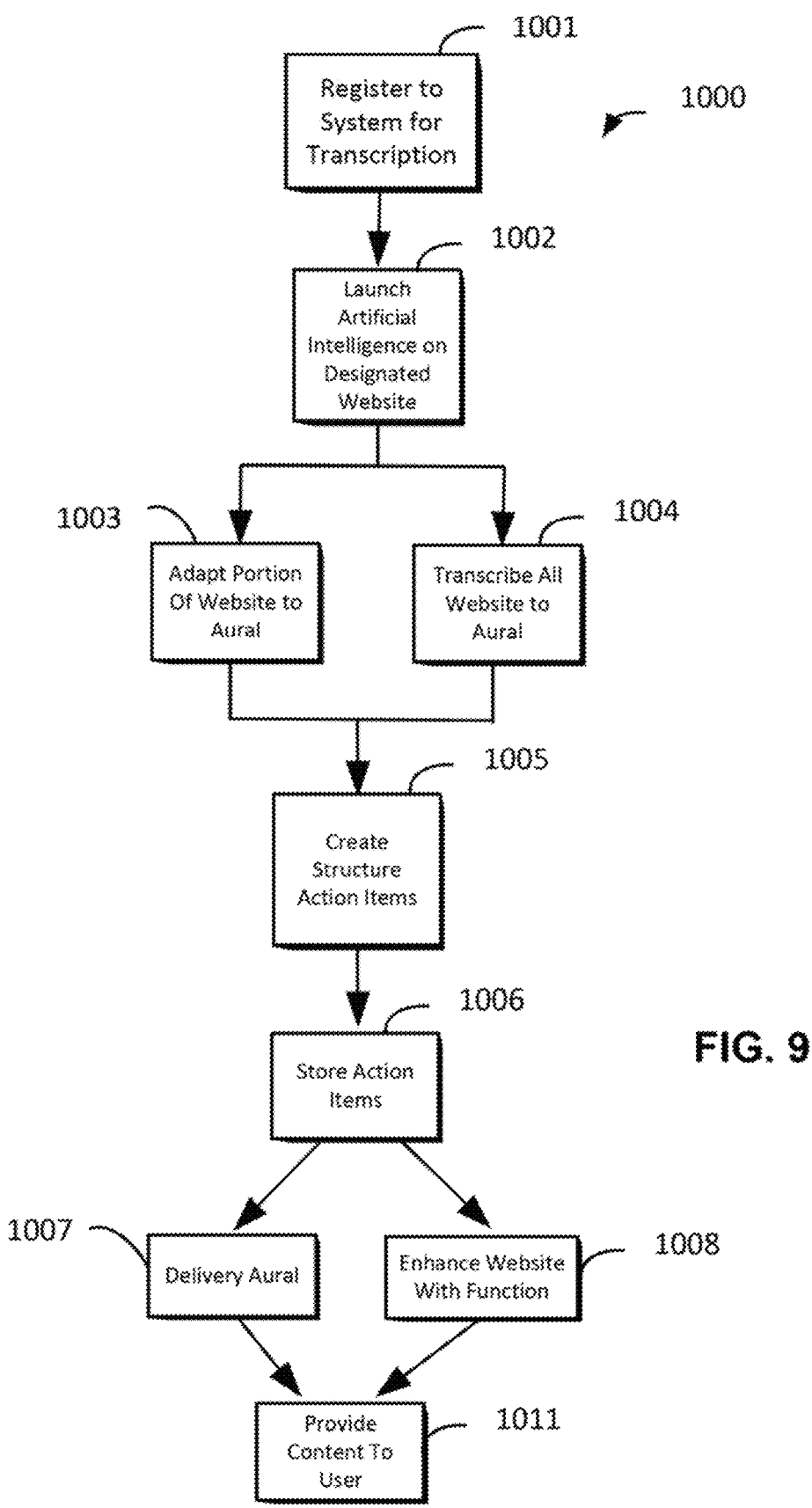
FIG. 9 illustrates the method steps linked with the transformation of a mostly visual website to an aural format website using the platform and system for the transcription of electronic online content from a mostly visual to an aural format according to one embodiment of the present disclosure.

In one embodiment as shown at FIG. 9, the above system and platform as described allows generally for multiple new methods 1000 of transcribing a mostly visual website into a mostly aural website. As shown generally, a person who owns a website will register to the system 1001 and request the processing of the target URL to adaptation for an aural system. In a subsequent step 1002, the system will launch a massive artificial intelligence engine, for example in the form of other software which will conduct multiple levels of analysis on the website. For example, some site will be recognized as having structure and this will be helpful to help excerpt important content for adaptation. In one possibility only a portion of the website will be transcribed 1003 but in a different command, the entire website can be transcribed 1004. The system then creates menus and structured Action Items 1005 for creating a new useful interface that can collaborate with skills in the aural systems.

The system then stores the data 1006 for access directly without the need to log into the generating technology and platform. The system is then delivered 1007 and can also be designed to enhance a website with the new functions (i.e. click here to get audio delivery) 1008. Finally the content is provided 1011 in the final step.

Generally speaking above is described and shown at FIG. 3 a system 100 for the transcription of electronic online content from a mostly visual to mostly aural format, the system comprising a plurality of customer personal computers 3 each having at least a first computer processor 4, a first computer memory 5 for executing HTLM browsing software 10 as shown at FIG. 4 in the first computer memory 5 by the first computer processor 5. Then a first connection to a network 2 for exchanging content 9 for delivery for a customer, and a first interface 8 which includes as shown at 3 and is connected to the first computer processor 4 with at least a speaker and a microphone as shown at 8 for receiving aural requests of the customer and responding by sending aural content from a website transcribed by the platform as shown as 1C at FIG. 6.

As shown at FIG. 6, at least one website owner personal computer 3C with at least a second computer processor, a second computer memory for executing software in the second computer memory by the second computer processor as shown generally at FIG. 3, a first computer display and visual interface connected to the second computer processor for interfacing with a website owner, and a second computer network connection to the network, wherein the software in the second computer processors and memory is a HTML format browser, at least a first network-enabled server connected to the network with a first server processor and a first server memory for hosting and executing a website with content for the customer, wherein the content is mostly in HTML and mostly in visual format, at least a second network-enabled server connected to the network with a second server processor and a second server memory for executing a software platform for the transcription at the request of the website owner at the website owner personal computer of the website owner's website residing in the first network-enabled server, the platform operating in the second server processor and memory including, a service registration module, wherein the website owner designates the website for processing from a mostly visual format to a mostly aural format, a software engine with artificial intelligence for initial and periodic transformation of the website content from mostly visual to a mostly aural format, wherein the artificial intelligence includes a digital linguistic tool (DLT) for the determination if the website was created using one of numerous automated website creation tools and associated template, and wherein a selected portion of the mostly visual webpages are transformed and stored as mostly aural content based on the automatic recognition of user entered information based on the template requirement of user entered information.

Also as explained, the software engine with artificial intelligence further includes the selection of a plugin designed based on the numerous website creation tool selected based on the determination of the digital linguistic tool and wherein the software engine with artificial intelligence further includes a parsing tool for the creation of a first map to determine for the website a value of verbosity. The software engine, in other examples, can reside on a web page or other cloud-based location and provide a user with the functionality previously described and the ability to view and manage such functionality. As such, the software engine and\or other tools can be a plugin or other web page design/maintenance interface module.

The value of verbosity, as explained above is a scaled value where at one end each word must be transcripted from visual to aural and where at the other range of the scaled value only a very minimum number of words must be transcripted from visual to aural. The AI further includes a scheme determination scrubbing tool for the optimal determination of what data was manually entered for the website and for emphasis in translation.

The software engine include a update timing module designed to compare a current versions of the website with a past version stored in a database for the determination of what was updated during a fixed period. The software engine also further includes a template relevance score scaled and where visual information on a webpage is given a ranking from high importance to low importance. Said also, the artificial intelligence further includes, (a) the selection of a plugin, (b) a parsing tool for the creation of a first map to determine for the website a value of verbosity, (c) a scheme determination scrubbing tool, (d) a update timing module designed to compare a current versions of the website with a past version stored in a database for the determination of what was updated during a fixed period, and (e) a template relevance score, and an Editing Layer Protocol (ELP).

Wherein the ELP further includes an acronym mask, a manual mode for full read override, the creation of an aural menu, and the offering and explanation of surfing tools. What is also described above generally and specifically is a method for the use of a system for the transcription of electronic online content from a mostly visual to mostly aural format, the system comprising a plurality of customer personal computers with HTLM browsing capacity each with at least a speaker and a microphone for receiving aural requests of the customer and responding by sending aural content from a website transcribed by the platform, at least one website owner personal computer also with a HTML browsing capacity, at least a first network-enabled server for hosting and executing a website with content for the customer, at least a second network-enabled server for executing a software platform for the transcription at the request of the website owner, the platform operating in the second server processor and memory including a software artificial intelligence engine, and a network for exchanging digital information and content between the above four elements (customer personal computers, website owner personal computer, a first network-enabled server, and a second network-enabled server).

The software platform is designed for the performance of the following steps (a) registry by a website owner using the at least one website owner personal computer of a website for the transformation by the system by accessing the platform located the at least second network-enabled server, (b) a launch of an artificial intelligence module located on the at least second network-enabled server executing the platform for the analysis and transcription, (c) adaptation of portions of visual website to aural portions by the artificial intelligence module, (d) creation of a menu and a structure of auction items linked with the website in aural format, (e) storage by the platform of the action items for indexing by any plurality of customer personal computers; and (f) delivery of action items in aural format to customers.

Finally, the step of launching of an artificial intelligence module for the analysis and transcription includes the sub-steps of (i) selecting a plugin designed based on the numerous website creation tool selected based on the determination of the digital linguistic tool, (ii) parsing for the creation of a first map to determine for the website a value of verbosity, (iii) running a scheme determination scrubbing tool, (iv) launching a timing module designed to compare a current versions of the website with a past version stored in a database for the determination of what was updated during a fixed period, and (v) using a template relevance score scaled and where visual information on a webpage is given a ranking from high importance to low importance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for the transcription of electronic online content from a mostly visual to mostly aural format, the system comprising:
 a plurality of customer personal computers each having at least a first computer processor, a first computer memory for executing HTLM browsing software in the first computer memory by the first computer processor, a first connection to a network for exchanging content for delivery for a customer, and a first interface connected to the first computer processor with at least a speaker and a microphone for receiving aural requests of the customer and responding by sending aural content from a website transcribed by the platform,
 at least one website owner personal computer with at least a second computer processor, a second computer memory for executing software in the second computer memory by the second computer processor, a first computer display and visual interface connected to the second computer processor for interfacing with a website owner, and a second computer network connection to the network, wherein the software in the second computer processors and memory is a HTML format browser,
 at least a first network-enabled server connected to the network with a first server processor and a first server memory for hosting and executing a website with content for the customer, wherein the content is mostly in HTML and mostly in visual format;
 at least a second network-enabled server connected to the network with a second server processor and a second server memory for executing a software platform for the transcription at the request of the web site owner at the web site owner personal computer of the website owner's website residing in the first network-enabled server, the platform operating in the second server processor and memory including:
 a service registration module, wherein the website owner designates the website for processing from a mostly visual format to a mostly aural format;
 a software engine with artificial intelligence for initial and periodic transformation of the website content from mostly visual to a mostly aural format, wherein the artificial intelligence includes a digital linguistic tool (DLT) for the determination if the website was created using one of numerous automated website creation tools and associated template, and wherein a selected portion of the mostly visual webpages are transformed and stored as mostly aural content based on the automatic recognition of user entered information based on the template requirement of user entered information;
 wherein the software engine with artificial intelligence further includes a parsing tool for the creation of a first map to determine for the website a value of verbosity; and
 wherein the value of verbosity is a scaled value where at one end each word must be transcripted from visual to aural and where at the other range of the scaled value only a very minimum number of words must be transcripted from visual to aural.

2. The platform of claim 1, wherein the software engine with artificial intelligence further includes the selection of a plugin designed based on the numerous website creation tool selected based on the determination of the digital linguistic tool.

3. A system for the transcription of electronic online content from a mostly visual to mostly aural format, the system comprising:
 a plurality of customer personal computers each having at least a first computer processor, a first computer memory for executing HTLM browsing software in the first computer memory by the first computer processor, a first connection to a network for exchanging content for delivery for a customer, and a first interface connected to the first computer processor with at least a speaker and a microphone for receiving aural requests of the customer and responding by sending aural content from a website transcribed by the platform,
 at least one website owner personal computer with at least a second computer processor, a second computer memory for executing software in the second computer memory by the second computer processor, a first computer display and visual interface connected to the second computer processor for interfacing with a website owner, and a second computer network connection to the network, wherein the software in the second computer processors and memory is a HTML format browser,
 at least a first network-enabled server connected to the network with a first server processor and a first server memory for hosting and executing a website with content for the customer, wherein the content is mostly in HTML and mostly in visual format;
 at least a second network-enabled server connected to the network with a second server processor and a second server memory for executing a software platform for the transcription at the request of the web site owner at the web site owner personal computer of the website owner's website residing in the first network-enabled server, the platform operating in the second server processor and memory including:
 a service registration module, wherein the website owner designates the website for processing from a mostly visual format to a mostly aural format;
 a software engine with artificial intelligence for initial and periodic transformation of the web site content from mostly visual to a mostly aural format, wherein the artificial intelligence includes a digital linguistic tool (DLT) for the determination if the website was created using one of numerous automated website creation tools and associated template, and wherein a selected portion of the mostly visual webpages are transformed and stored as mostly aural content based on the automatic recognition of user entered information based on the template requirement of user entered information;
 wherein the software engine with artificial intelligence further includes a scheme determination scrubbing tool for the optimal determination of what data was manually entered for the website and for emphasis in translation.

4. The platform of claim 1, wherein the software engine includes a update timing module designed to compare a current versions of the website with a past version stored in a database for the determination of what was updated during a fixed period.

5. The platform of claim 4, where the software engine further includes a template relevance score scaled and where visual information on a webpage is given a ranking from high importance to low importance.

6. A system for the transcription of electronic online content from a mostly visual to mostly aural format, the system comprising:
   a plurality of customer personal computers each having at least a first computer processor, a first computer memory for executing HTLM browsing software in the first computer memory by the first computer processor, a first connection to a network for exchanging content for delivery for a customer, and a first interface connected to the first computer processor with at least a speaker and a microphone for receiving aural requests of the customer and responding by sending aural content from a website transcribed by the platform,
   at least one website owner personal computer with at least a second computer processor, a second computer memory for executing software in the second computer memory by the second computer processor, a first computer display and visual interface connected to the second computer processor for interfacing with a website owner, and a second computer network connection to the network, wherein the software in the second computer processors and memory is a HTML format browser,
   at least a first network-enabled server connected to the network with a first server processor and a first server memory for hosting and executing a website with content for the customer, wherein the content is mostly in HTML and mostly in visual format;
   at least a second network-enabled server connected to the network with a second server processor and a second server memory for executing a software platform for the transcription at the request of the web site owner at the web site owner personal computer of the website owner's website residing in the first network-enabled server, the platform operating in the second server processor and memory including:
   a service registration module, wherein the website owner designates the website for processing from a mostly visual format to a mostly aural format;
   a software engine with artificial intelligence for initial and periodic transformation of the web site content from mostly visual to a mostly aural format, wherein the artificial intelligence includes a digital linguistic tool (DLT) for the determination if the website was created using one of numerous automated website creation tools and associated template, and wherein a selected portion of the mostly visual webpages are transformed and stored as mostly aural content based on the automatic recognition of user entered information based on the template requirement of user entered information;
   wherein the software engine with artificial intelligence further includes, (a) the selection of a plugin, (b) a parsing tool for the creation of a first map to determine for the website a value of verbosity, (c) a scheme determination scrubbing tool, (d) a update timing module designed to compare a current versions of the website with a past version stored in a database for the determination of what was updated during a fixed period, (e) a template relevance score, and an Editing Layer Protocol (ELP).

7. The platform of claim 6, wherein the ELP further includes an acronym mask, a manual mode for full read override, the creation of an aural menu, and the offering and explanation of surfing tools.

* * * * *